US012690091B2

(12) United States Patent
Dai et al.

(10) Patent No.: US 12,690,091 B2
(45) Date of Patent: Jul. 21, 2026

(54) SIGNALING RADIO BEARER (SRB) TRANSMISSION USING SMALL DATA TRANSMISSION (SDT)

(71) Applicant: Lenovo (Beijing) Limited, Beijing (CN)

(72) Inventors: Mingzeng Dai, Shanghai (CN); Ran Yue, Beijing (CN); Lianhai Wu, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 326 days.

(21) Appl. No.: 18/553,023

(22) PCT Filed: Apr. 2, 2021

(86) PCT No.: PCT/CN2021/085383
§ 371 (c)(1),
(2) Date: Sep. 28, 2023

(87) PCT Pub. No.: WO2022/205450
PCT Pub. Date: Oct. 6, 2022

(65) Prior Publication Data
US 2024/0215103 A1 Jun. 27, 2024

(51) Int. Cl.
*H04W 76/27* (2018.01)
*H04W 76/22* (2018.01)

(52) U.S. Cl.
CPC ........... *H04W 76/27* (2018.02); *H04W 76/22* (2018.02)

(58) Field of Classification Search
CPC .............................. H04W 76/27; H04W 76/22
See application file for complete search history.

(56) References Cited

U.S. PATENT DOCUMENTS

| | | | | |
|---|---|---|---|---|
| 2015/0131618 A1* | 5/2015 | Chen | ................... | H04W 84/005 |
| | | | | 370/332 |
| 2019/0215870 A1* | 7/2019 | Babaei | .................. | H04W 24/10 |
| 2020/0053791 A1 | 2/2020 | Ozturk et al. | | |
| 2020/0127939 A1* | 4/2020 | Parker | .................. | G06F 9/5016 |
| 2020/0351955 A1* | 11/2020 | Jeon | ...................... | H04L 1/1642 |
| 2021/0211994 A1* | 7/2021 | Shih | ..................... | H04W 80/02 |
| 2021/0297925 A1* | 9/2021 | Berzin | .............. | H04W 28/0268 |

(Continued)

FOREIGN PATENT DOCUMENTS

WO      WO-2020189958 A1 *   9/2020   ............ H04W 76/19

OTHER PUBLICATIONS

"Small data transmission with RA-based schemes" (Year: 2021).*

(Continued)

*Primary Examiner* — Mewale A Ambaye
(74) *Attorney, Agent, or Firm* — FIG. 1 Patents

(57) ABSTRACT

Methods and apparatus of Signaling Radio Bearer (SRB) transmission using Small Data Transmission (SDT) are disclosed. The method includes: a base station receiving, from UE in RRC_INACTIVE or RRC_IDLE state, a small data packet, wherein the small data packet includes an SRB (Signaling Radio Bearer); sending a retrieve UE context request to a last serving base station of the UE; and receiving, from the last serving base station, UE context for anchor relocation, or SRB data forwarding information and/or a SRB configuration, for transmission of the small data packet.

20 Claims, 7 Drawing Sheets

---

702
receiving, from a base station, a retrieve UE context request that was initiated by reception of a small data packet with SRB (Signaling Radio Bearer) from a user equipment (UE) in RRC_INACTIVE or RRC_IDLE state 704
sending, to the base station, UE context in response to a determination that anchor relocation is required 706
sending, to the base station, SRB data forwarding information and/or a SRB configuration in response to a determination that anchor relocation is not required

(56) References Cited

U.S. PATENT DOCUMENTS

2022/0022247 A1* 1/2022 Agiwal ............. H04W 72/0453
2022/0225209 A1* 7/2022 Zhu ..................... H04W 40/248

OTHER PUBLICATIONS

PCT/CN2021/085383, "International Preliminary Report on Patentability", PCT Application No. PCT/CN2021/085383, Oct. 12, 2023, 5 pages.

PCT/CN2021/085383, "International Search Report and Written Opinion", PCT Application No. PCT/CN2021/085383, Jan. 4, 2022, 6 pages.

VIVO, "Discussion on RRC-controlled small data transmission", 3GPP TSG-RAN WG2 Meeting #112-electronic, R2-2008959, Online [retrieved Nov. 22, 2023]. Retrieved from the Internet <https://www. 3gpp.org/ftp/TSG_RAN/WG2_RL2/TSGR2_112-e/Docs>, Nov. 2020, 6 pages.

ZTE Corporation, et al., "Context fetch and data forwarding for SDT", 3GPP TSG-RAN2#112e, R2-2009193, eMeeting [retrieved Nov. 22, 2023]. Retrieved from the Internet <https://www.3gpp.org/ ftp/TSG_RAN/WG2_RL2/TSGR2_112-e/Docs>, Nov. 2020, 11 pages.

ZTE Corporation, et al., "Open issues for RACH based SDT", 3GPP TSG-RAN WG2 #113b-e, R2-2103020, eMeeting [retrieved Nov. 22, 2023]. Retrieved from the Internet <https://www.3gpp.org/ftp/ tsg_ran/WG2_RL2/TSGR2_113bis-e/Docs>, Apr. 2021, 17 pages.

"Extended European Search Report", EP Application No. 21934107. 0, Nov. 18, 2024, 10 pages.

Huawei, et al., "Small data transmission with RA-based schemes", 3GPP TSG-RAN WG2 #113-e, R2-2101214, E-meeting, Jan. 2021, 11 pages.

"Foreign Office Action", JP Application No. 2023-560690, Jun. 18, 2025, 9 pages.

* cited by examiner

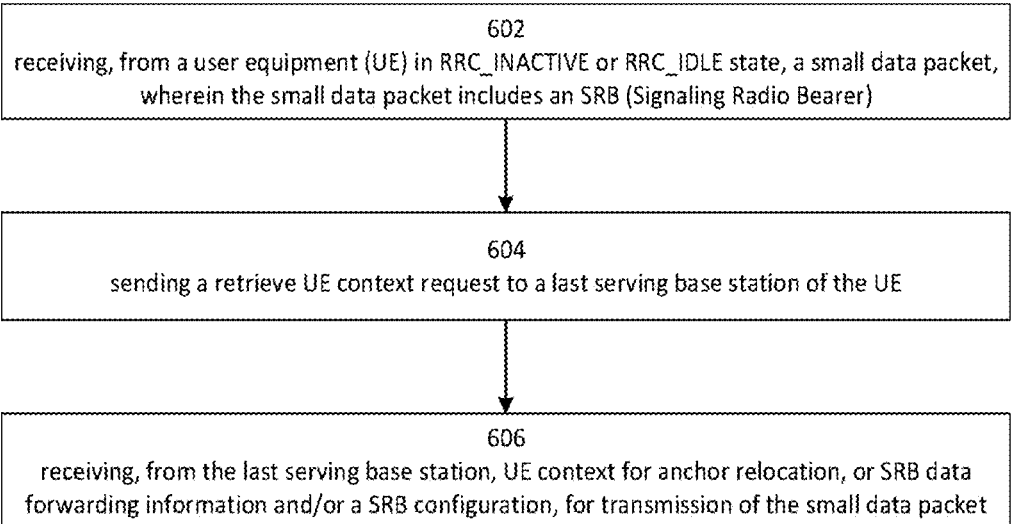

602
receiving, from a user equipment (UE) in RRC_INACTIVE or RRC_IDLE state, a small data packet, wherein the small data packet includes an SRB (Signaling Radio Bearer)

604
sending a retrieve UE context request to a last serving base station of the UE

606
receiving, from the last serving base station, UE context for anchor relocation, or SRB data forwarding information and/or a SRB configuration, for transmission of the small data packet

Figure 6

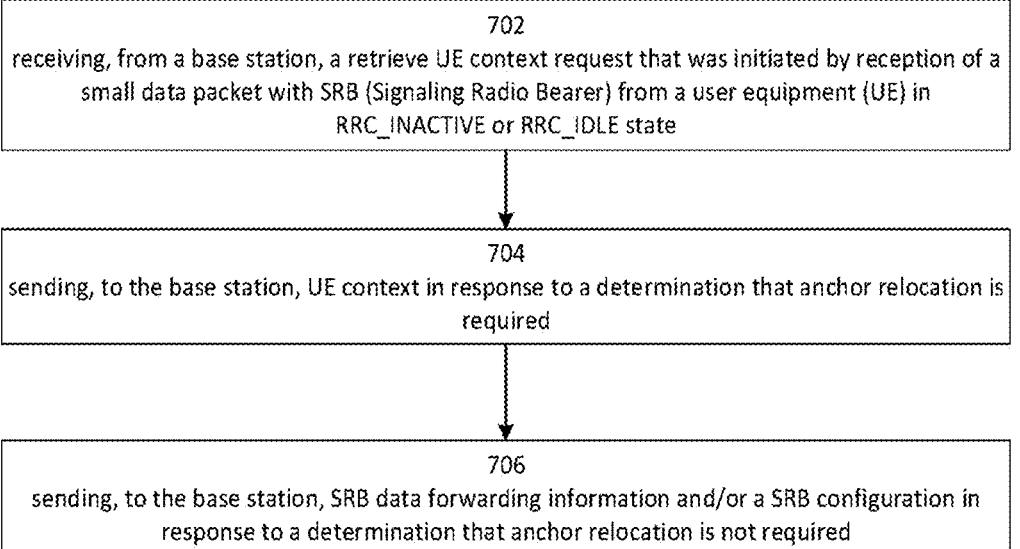

702
receiving, from a base station, a retrieve UE context request that was initiated by reception of a small data packet with SRB (Signaling Radio Bearer) from a user equipment (UE) in RRC_INACTIVE or RRC_IDLE state

704
sending, to the base station, UE context in response to a determination that anchor relocation is required

706
sending, to the base station, SRB data forwarding information and/or a SRB configuration in response to a determination that anchor relocation is not required

Figure 7

SIGNALING RADIO BEARER (SRB) TRANSMISSION USING SMALL DATA TRANSMISSION (SDT)

FIELD

The subject matter disclosed herein relates generally to wireless communication and more particularly relates to, but not limited to, methods and apparatus of Signaling Radio Bearer (SRB) transmission using Small Data Transmission (SDT).

BACKGROUND

The following abbreviations and acronyms are herewith defined, at least some of which are referred to within the specification:

Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Acknowledgement (ACK), Random Access Channel (RACH), Configured Grant (CG), Frequency Division Multiple Access (FDMA), Media Access Control (MAC), Non-Access Stratum (NAS), Packet Data Convergence Protocol (PDCP), Protocol Data Unit (PDU), Radio Access Network (RAN), Radio Link Control (RLC), Radio Network Temporary Identifier (RNTI), Radio Resource Control (RRC), Service Data Adaptation Protocol (SDAP), Access and Mobility Management Function (AMF), Cell Radio Network Temporary Identifier (C-RNTI), Frequency Range 1 (FR1), Frequency Range 2 (FR2), Internet Protocol (IP), NG Application Protocol (NGAP), 5G Core Network (5GC), The interface between the gNB and the 5GC (NG), Physical Cell Identity (PCI), Service Data Unit (SDU), Technical Specification (TS), User Plane Function (UPF), The interface between gNBs (Xn), GPRS Tunnelling Protocol User Plane (GTP-U), RAN-based Notification Area (RNA), Xn Application Protocol (XnAP), Signaling Radio Bearer (SRB), Data Radio Bearer (DRB), Small Data Transmission (SDT), Tunnel Endpoint Identifier (TEID), Inactive Radio Network Temporary Identifier (I-RNTI).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHZ) is called FR2. The 5G NR supports both FR1 and FR2 frequency bands.

NR supports RRC_INACTIVE state, and UEs with infrequent (periodic and/or non-periodic) data transmission are generally maintained by the network in the RRC_INACTIVE state. Until Release 16, the RRC_INACTIVE state does not support data transmission. Hence, the UE has to resume the connection (i.e., moving to the RRC_CONNECTED state) for any DL and UL data. Connection setup and subsequent release to INACTIVE state are required for each data transmission no matter how small and infrequent the data packets are. This results in unnecessary power consumption and signalling overhead.

SUMMARY

Methods and apparatus of SRB transmission using SDT are disclosed.

According to a first aspect, there is provided a method performed by a current serving base station, including: receiving, from a user equipment (UE) in RRC_INACTIVE or RRC_IDLE state, a small data packet, wherein the small data packet includes an SRB (Signaling Radio Bearer); sending a retrieve UE context request to a last serving base station of the UE; and receiving, from the last serving base station, UE context for anchor relocation, or SRB data forwarding information and/or a SRB configuration, for transmission of the small data packet.

According to a second aspect, there is provided a method performed by a last serving base station, including: receiving, from a base station, a retrieve UE context request that was initiated by reception of a small data packet with SRB (Signaling Radio Bearer) from a user equipment (UE) in RRC_INACTIVE or RRC_IDLE state; sending, to the base station, UE context in response to a determination that anchor relocation is required; and sending, to the base station, SRB data forwarding information and/or a SRB configuration in response to a determination that anchor relocation is not required.

According to a third aspect, there is provided a current serving base station, including: a processor; a transceiver coupled to the processor, wherein the processor is configured: to receive, from a user equipment (UE) in RRC_INACTIVE or RRC_IDLE state, a small data packet, wherein the small data packet includes an SRB (Signaling Radio Bearer); to send a retrieve UE context request to a last serving base station of the UE; and to receive, from the last serving base station, UE context for anchor relocation, or SRB data forwarding information and/or a SRB configuration, for transmission of the small data packet.

According to a fourth aspect, there is provided a last serving base station, including: a processor; a transceiver coupled to the processor, wherein the processor is configured: to receive, from a base station, a retrieve UE context request that was initiated by reception of a small data packet with SRB (Signaling Radio Bearer) from a user equipment (UE) in RRC_INACTIVE or RRC_IDLE state; to send, to the base station, UE context in response to a determination that anchor relocation is required; and to further send, to the base station, SRB data forwarding information and/or a SRB configuration in response to a determination that anchor relocation is not required.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 6 is a flow chart illustrating steps of SRB transmission using SDT by receiving gNB in accordance with some implementations of the present disclosure; and FIG. 7 is a flow chart illustrating steps of SRB transmission using SDT by last serving gNB in accordance with some implementations of the present disclosure.

DETAILED DESCRIPTION

Figure 1:
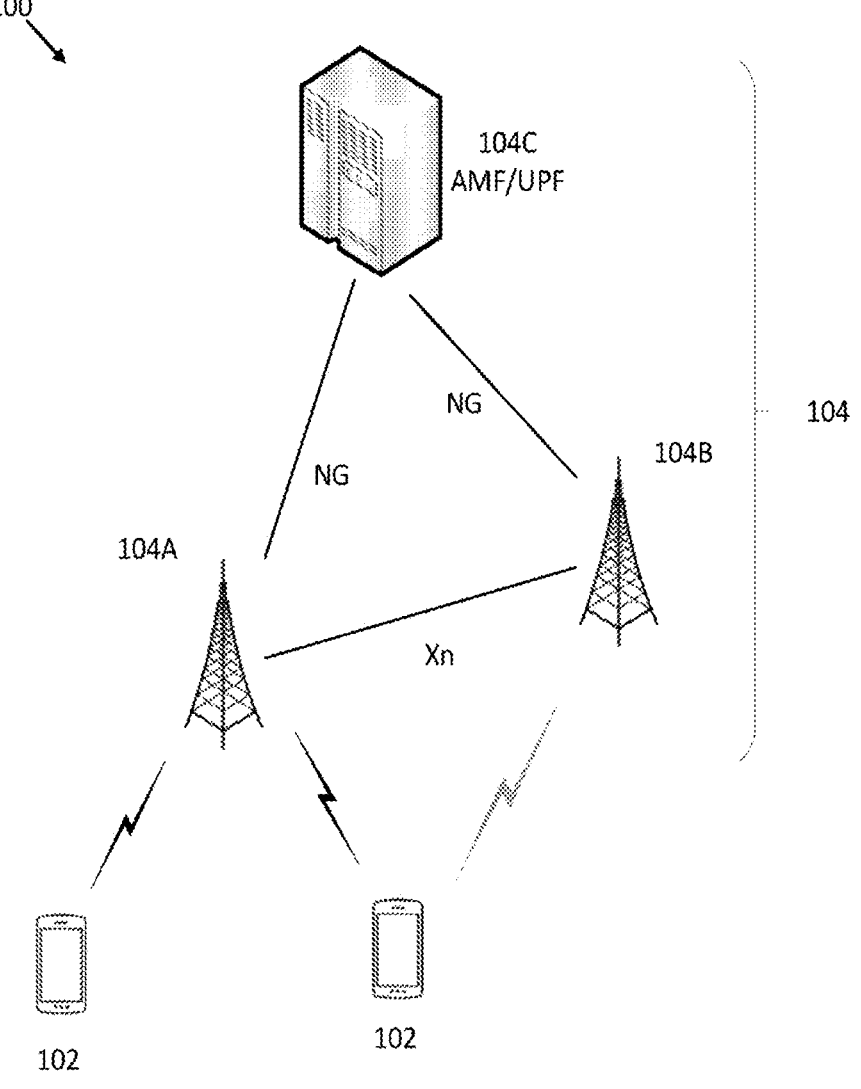
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example. "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B." which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, may be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 (e.g., 104A, 104B, 104C) is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

In the example shown in FIG. 1, the NEs 104 may include gNBs 104A, 104B and 5G core network (5GC) 104C. The gNB 104A may be the receiving gNB of a UE 102, where gNB 104B may be the last serving gNB of the UE 102.

Communication links are provided between the gNB 104A and the UE 102, which may be UL or DL communication links. Some UEs 102 may simultaneously communicate with different Radio Access Technologies (RATs), such as NR and LTE. Direct or indirect communication link Xn between two or more gNBs 104A, 104B may be provided.

5G core network (5GC) 104C may include Access and Mobility Management Function (AMF) and User Plane Function (UPF). Communication links NG between the gNBs 104A, 104B and 5G core network (5GC) may also be provided.

Figure 2:
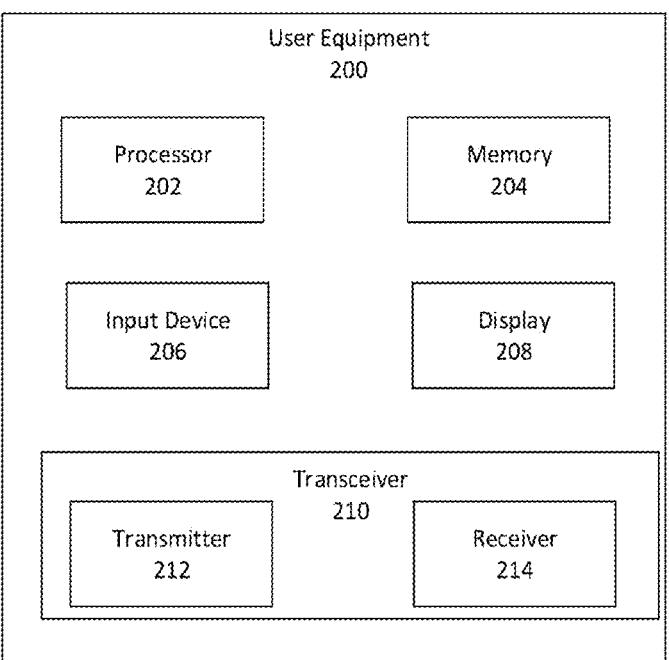
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
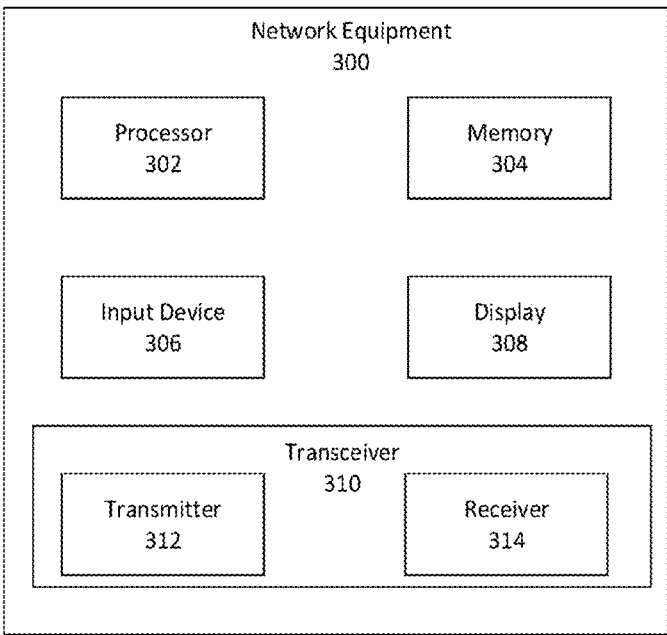
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 (or gNB 300) may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200. The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

Figure 4A:
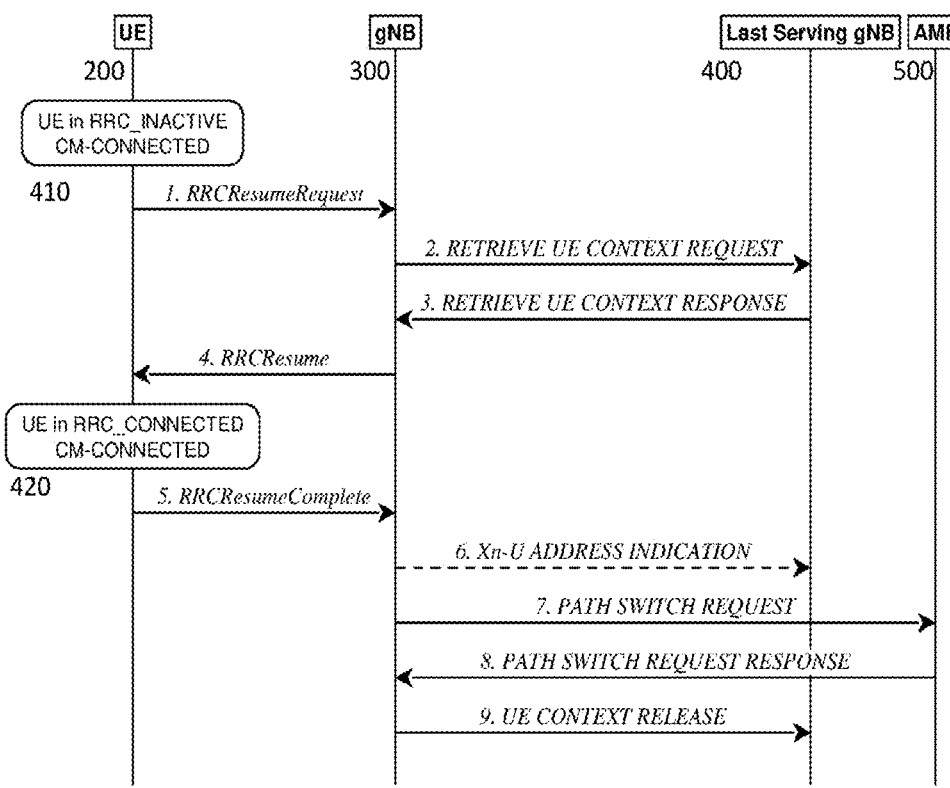
FIG. 4A is a schematic diagram illustrating an example of UE triggered transition from RRC_INACTIVE to RRC_CONNECTED in accordance with some implementations of the present disclosure.
Figure 4B:
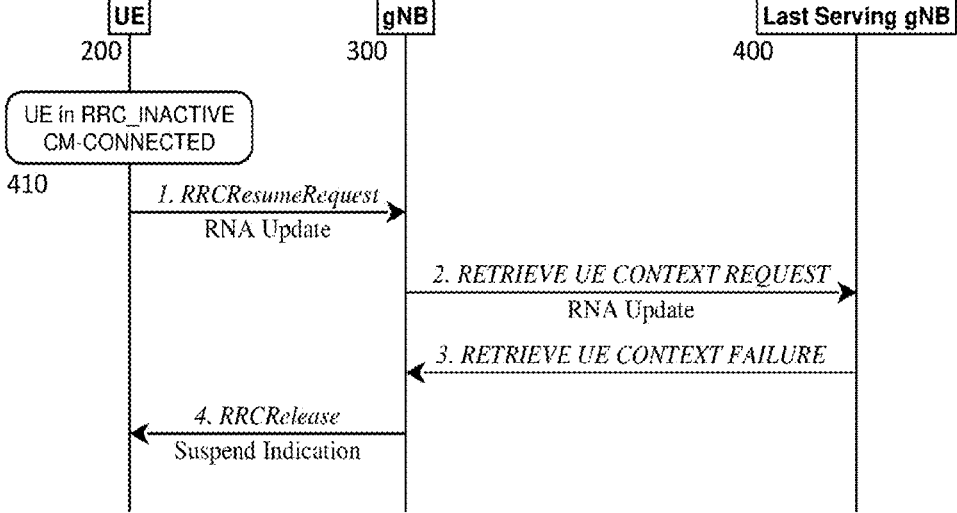
FIG. 4B is a schematic diagram illustrating an example of periodic RNA update procedure without UE context relocation in accordance with some implementations of the present disclosure.

NR supports RRC_INACTIVE state and UEs with infrequent (periodic and/or non-periodic) data transmission are generally maintained by the network in the RRC_INACTIVE state. The UEs have to transit to the RRC_CONNECTED state for any DL and UL data. FIG. 4A is a schematic diagram illustrating an example of UE triggered transition from RRC_INACTIVE to RRC_CONNECTED in accordance with some implementations of the present disclosure; and FIG. 4B is a schematic diagram illustrating an example of periodic RNA (RAN-based Notification Area) update procedure without UE context relocation in accordance with some implementations of the present disclosure. In FIGS. 4A and 4B, messages are transmitted among the UE 200, the receiving gNB 300 that is currently in communication with the UE 200, the last serving gNB 400 of the UE 200, and/or AMF 500.

As illustrated in FIG. 4A, state transition from RRC_INACTIVE state to RRC_CONNECTED state is described in the Technical Specification TS 38.300 as follows.

---

The following figure describes the UE triggered transition from RRC_INACTIVE to RRC_CONNECTED in case of UE context retrieval success:

1. The UE resumes from RRC_INACTIVE, providing the I-RNTI, allocated by the last serving gNB.
2. The gNB, if able to resolve the gNB identity contained in the I-RNTI, requests the last serving gNB to provide UE Context data.
3. The last serving gNB provides UE context data.
4/5. The gNB and UE completes the resumption of the RRC connection.
6. If loss of DL user data buffered in the last serving gNB shall be prevented, the gNB provides forwarding addresses.
7/8. The gNB performs path switch.
9. The gNB triggers the release of the UE resources at the last serving gNB.

---

NOTE:

User Data can also be sent in step 5 if the grant allows.

In FIG. 4A, the UE 200 is initially in the RRC_INACTIVE state 410. It sends an RRCResumeRequest message to the gNB 300 (or the receiving gNB 300). Upon receiving the RRC message, the gNB 300 forwards a RETRIEVE UE CONTEXT REQUEST message to the last serving gNB 400 of the UE 200, which in turn returns a RETRIEVE UE CONTEXT RESPONSE message. The gNB 300 then sends an RRCResume message to the UE, and the UE is switched to the RRC-CONNECTED state 420. The UE then sends an RRCResumeComplete message to the receiving gNB 300, which triggers the procedures 6-9 to complete the path switch.

The periodic RNA (RAN-based Notification Area) update procedure without UE context relocation shown in FIG. 4B is described in the Technical Specification TS 38.300 as follows.

The following figure describes the RNA update procedure for the case when the UE is still within the configured RNA and the last serving gNB decides not to relocate the UE context and to keep the UE in RRC_INACTIVE:

| | |
|---|---|
| 1. | The UE resumes from RRC_INACTIVE, providing the I-RNTI allocated by the last serving gNB and appropriate cause value, e.g., RAN notification area update. |
| 2. | The gNB, if able to resolve the gNB identity contained in the I-RNTI, requests the last serving gNB to provide UE Context, providing the cause value received in step 1. |
| 3. | The last serving gNB stores received information to be used in the next resume attempt (e.g. C-RNTI and PCI related to the resumption cell), and responds to the gNB with the RETRIEVE UE CONTEXT FAILURE message including an encapsulated RRCRelease message. The RRCRelease message includes Suspend Indication. |
| 4. | The gNB forwards the RRCRelease message to the UE. |

In FIG. 4B, the UE 200 is initially in the RRC_INACTIVE state 410. It sends an RRCResumeRequest message to the gNB 300 with RAN (Radio Access Network) notification area update. The receiving gNB 300 forwards a RETRIEVE UE CONTEXT REQUEST message to the last serving gNB 400 of the UE 200 with the received RAN notification area update. The last serving gNB 400 responds to the receiving gNB 300 with a RETRIEVE UE CONTEXT FAILURE message, and the gNB 300 in turns forwards an RRCRelease message to the UE 200. The UE 200 is kept in the RRC_INACTIVE state 410.

In Release 17, small data transmission in RRC_INACTIVE state is enabled, without UE being switched to the RRC_CONNECTED state. Currently, only DRB SDT is considered during context fetch and data forwarding with anchor relocation and without anchor relocation. How to support SRB SDT during context fetch and data forwarding procedures with anchor relocation and without anchor relocation has not been addressed. In the disclosure, methods of SRB transmission using SDT to support context fetch and data forwarding are proposed, and explained with the following exemplary embodiments.

Dedicated Data Forwarding GTP-U Tunnel for SRB PDCP PDU without Anchor Relocation In some embodiments, SRB SDT without anchor relocation is performed. In order to send the NAS PDU which is encapsulated in the SRB to AMF, the receiving gNB 300 needs to forward the SRB to the last serving gNB 400 via a dedicated GTP-U tunnel. In one embodiment, PDCP PDU of the SRB is forwarded from the receiving gNB 300 to the last serving gNB 400. "Signalling Radio Bearers" (SRBs) are defined as Radio Bearers (RBs) that are used only for the transmission of RRC and NAS messages.

Figure 5A:
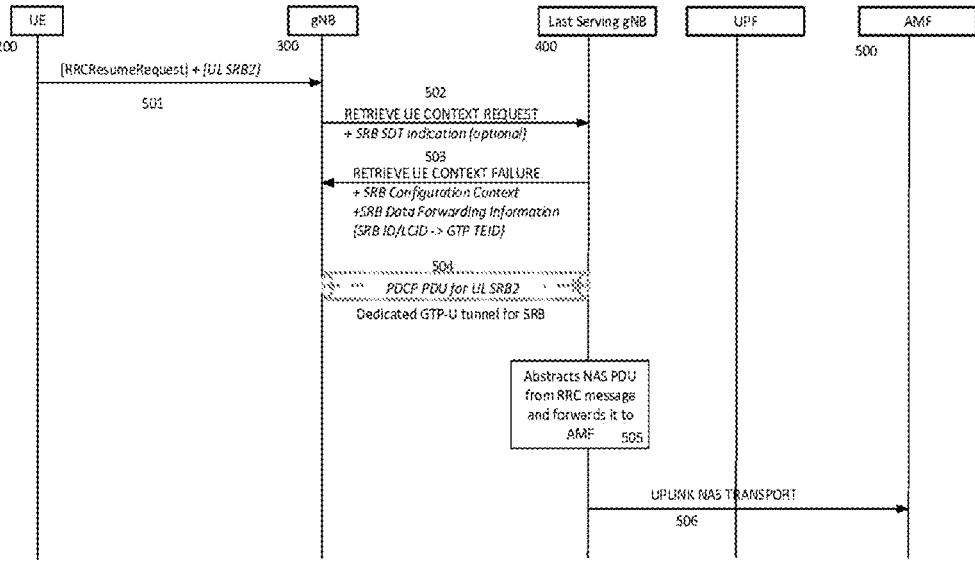
FIG. 5A is a schematic diagram illustrating an example of dedicated SRB Data Forwarding GTP-U Tunnel without anchor relocation in accordance with some implementations of the present disclosure.

FIG. 5A is a schematic diagram illustrating an example of dedicated SRB Data Forwarding GTP-U Tunnel without anchor relocation in accordance with some implementations of the present disclosure.

As shown in FIG. 5A, the UE 200 sends an RRCResumeRequest message with the UL Small Data including an SRB (e.g., SRB2) to the receiving gNB 300 (step 501 in FIG. 5A). The UL small data may be transmitted in RACH (Random Access Channel) based or CG (Configured Grant) based SDT. Optionally, an SRB SDT indication may be provided to indicate that the small data includes the SRB, and the corresponding SRB type may also be indicated. The indication may be in the RRCResumeRequest message, or in the MAC sub-header of the MAC PDU.

Upon receiving the UL Small Data including the SRB, if the receiving gNB 300 is able to resolve the gNB identity contained in the I-RNTI (Inactive Radio Network Temporary Identifier), it requests the last serving gNB 400 to provide UE Context data by sending the RETRIEVE UE CONTEXT REQUEST message (step 502). Optionally, the SRB SDT indication may be included in the message, so that the last serving gNB 400, upon receiving the message, knows that the small data includes the SRB, and the corresponding SRB type (i.e. SRB1 or SRB2) may also be indicated. The SRB SDT indication may be included in assisting information, which is used for the last serving gNB 400 to determine whether anchor relocation is required.

In some embodiments, the last serving gNB 400 determines that anchor relocation is not required. According to the SRB SDT indication, the last serving gNB 400 determines that data forwarding for SRB is needed and allocates the SRB data forwarding information. The SRB data forwarding information may include the IP address and GTP-U TEID of a GTP-U tunnel. The SRB data forwarding information may be per SRB type (i.e. SRB1 or SRB2). Alternatively, the SRB data forwarding information may be applied for both SRB1 and SRB2. The last serving gNB 400 sends the RETRIEVE UE CONTEXT FAILURE message and the SRB data forwarding information to the receiving gNB 300 (step 503). The last serving gNB 400 may also send the SRB configuration to the receiving gNB 300. The SRB configuration may include the RLC configuration of the SRB. Alternatively, the last serving gNB 400 may always allocate the SRB data forwarding information regardless whether the SRB SDT indication is received or not.

According to the SRB configuration received, the receiving gNB 300 abstracts the PDCP PDU of SRB and identifies the SRB type. The receiving gNB 300 then forwards the PDCP PDU of SRB via the corresponding GTP-U tunnel (e.g., a dedicated GTP-U tunnel for SRB) with the IP address and GTP-U TEID (step 504).

Upon receiving the PDCP PDU of SRB, the last serving gNB 400 processes PDCP related handling for the PDCP PDU of SRB according to the mapping between the SRB data forwarding information and the SRB type. And the last receiving gNB 400 abstracts the NAS PDU from the RRC message (step 505) and forwards the NAS PDU to the AMF 500 (step 506).

According to some embodiments, the receiving gNB 300 receives, from the UE 200 in RRC_INACTIVE state, the small data packet including the SRB; sends the retrieve UE context request to the last serving gNB 400 of the UE 200; and receives, from the last serving gNB 400, the SRB data forwarding information and the SRB configuration. The receiving gNB 300 abstracts the PDCP PDU of the SRB, and sends the PDCP PDU to the last serving gNB 400 via a dedicated GTP-U tunnel.

The last serving gNB 400 receives, from the receiving gNB 300, the retrieve UE context request that was initiated by the reception of the small data packet with SRB from the UE 200 in RRC_INACTIVE state; and sends, to the receiving gNB 300, the SRB data forwarding information and the SRB configuration in response to a determination that anchor relocation is not required. The last serving gNB 400 further receives, from the receiving gNB 300, the PDCP PDU of the SRB via a dedicated GTP-U tunnel.

In another example, the SRB SDT (e.g., the small data packet including the SRB) may come later than the UE context fetch procedure. For example, it may be sent after receiving the RETRIEVE UE CONTEXT FAILURE message. In this case, the receiving gNB 300 may also send the SRB SDT indication to the last serving gNB 400 in a new XnAP message. Correspondingly, the last serving gNB 400 sends the SRB data forwarding information to the receiving gNB 300 for data forwarding of the SRB PDCP PDU.

SRB PDCP PDU Transmission Over Control Plane without Anchor Relocation

In some embodiments, SRB SDT without anchor relocation is performed. In order to send the NAS PDU which is encapsulated in the SRB to AMF, the receiving gNB 300 may forward the SRB PDCP PDU to the last serving gNB 400 via control plane Xn signaling.

Figure 5B:
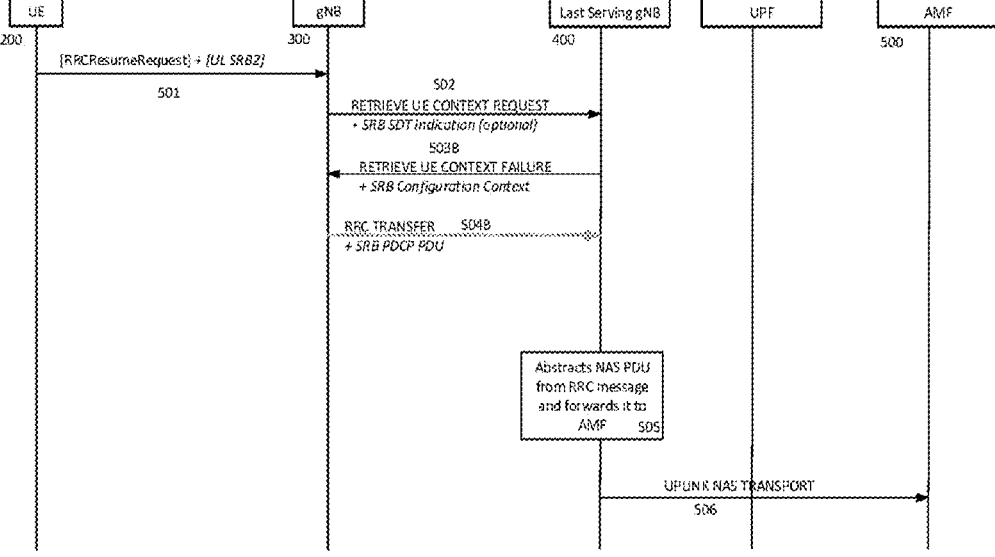
FIG. 5B is a schematic diagram illustrating an example of SRB PDCP PDU transmission over control plane without anchor relocation in accordance with some implementations of the present disclosure.

FIG. 5B is a schematic diagram illustrating an example of SRB PDCP PDU transmission over control plane without anchor relocation in accordance with some implementations of the present disclosure.

The UE 200 sends an RRCResumeRequest message with the UL Small Data including an SRB (e.g., SRB2) to the receiving gNB 300 (step 501). The UL small data may be transmitted in RACH (Random Access Channel) based or CG (Configured Grant) based SDT. Optionally, an SRB SDT indication may be provided to indicate that the small data includes the SRB, and the corresponding SRB type may also be indicated. The indication may be in the RRCResumeRequest message, or in the MAC sub-header of the MAC PDU.

Upon receiving the UL Small Data including the SRB, if the receiving gNB 300 is able to resolve the gNB identity contained in the I-RNTI (Inactive Radio Network Temporary Identifier), it requests the last serving gNB 400 to provide UE Context data by sending an XnAP message, e.g. the RETRIEVE UE CONTEXT REQUEST message (step 502). Optionally, the SRB SDT indication may be included in the message, so that the last serving gNB 400, upon receiving the message, knows that the small data includes the SRB, and the corresponding SRB type may also be indicated. The SRB SDT indication may be included in assisting information, which is used for the last serving gNB 400 to determine whether anchor relocation is required.

Upon receiving the RETRIEVE UE CONTEXT REQUEST with or without the SRB SDT indication, the last serving gNB 400 determines that anchor relocation is not required. The last serving gNB 400 sends an XnAP message e.g. the RETRIEVE UE CONTEXT FAILURE message and the SRB configuration to the receiving gNB 300 (step 503B). The SRB configuration may include the RLC configuration of the SRB. In some embodiments as shown in FIG. 5B, the last serving gNB 400 may send the SRB configuration only, without the SRB data forwarding information, to the receiving gNB 300.

According to the SRB configuration, the receiving gNB 300 abstracts the PDCP PDU of SRB and identifies the SRB type. The receiving gNB 300 forwards the PDCP PDU of SRB to the last serving gNB 400 via XnAP signalling, e.g., an RRC TRANSFER message (step 504B). The SRB type (i.e. SRB1 or SRB2) may be indicated in the an XnAP message, i.e the RRC TRANSFER message.

Upon receiving the PDCP PDU of SRB, the last serving gNB 400 processes PDCP related handling for the PDCP PDU of SRB. And the last receiving gNB 400 abstracts NAS PDU from the RRC message (step 505) and forwards the NAS PDU to the AMF 500 (step 506).

Since the SRB SDT may come later than the UE context fetch procedure, the receiving gNB 300 may send the RRC TRANSFER message at any time before UE release.

According to some embodiments, the receiving gNB 300 receives, from the last serving gNB 400, the SRB configuration; and sends the abstracted PDCP PDU to the last serving gNB 400 via XnAP control plane signaling.

The last serving gNB 400 sends, to the receiving gNB 300, the SRB configuration in response to a determination that anchor relocation is not required; and receives, from the receiving gNB 300, the PDCP PDU of the SRB via via XnAP control plane signaling.

Data Forwarding GTP-U Tunnel for MAC PDU Including SRB without Anchor Relocation In some embodiments, a data forwarding tunnel for MAC PDU may be used for data forwarding in the case of SRB SDT without anchor relocation. The MAC PDU may include the SRB. It is also possible that both SRB and DRB are multiplexed in the MAC PDU. In some embodiments, it is not required to send the SRB configuration from the last serving gNB 400 to the receiving gNB 300.

Figure 5C:
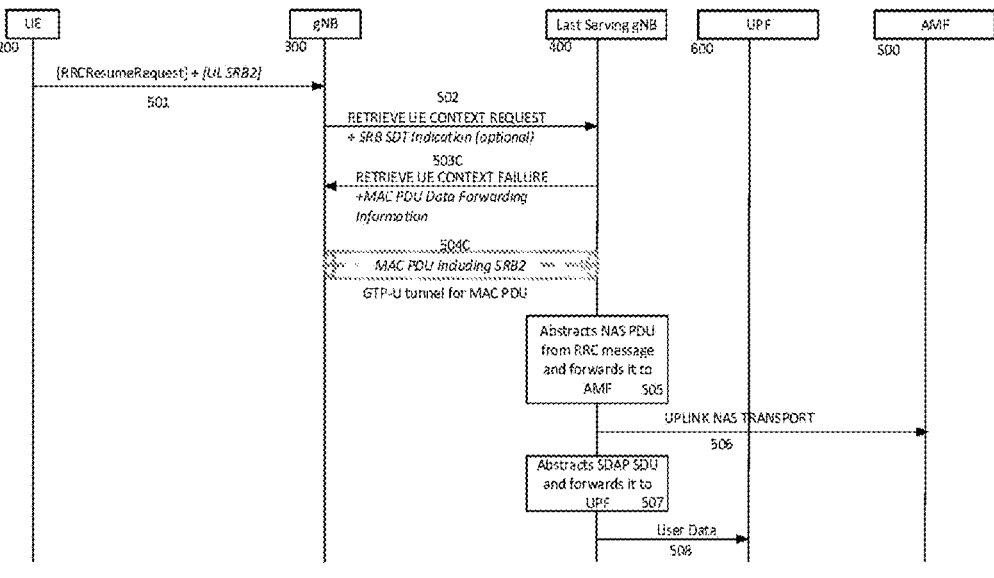
FIG. 5C is a schematic diagram illustrating an example of common Data Forwarding GTP-U Tunnel for MAC PDU including SRB without anchor relocation in accordance with some implementations of the present disclosure.

FIG. 5C is a schematic diagram illustrating an example of common Data Forwarding GTP-U Tunnel for MAC PDU including SRB without anchor relocation in accordance with some implementations of the present disclosure.

The UE 200 sends an RRCResumeRequest message with the UL Small Data including an SRB (e.g., SRB2) to the receiving gNB 300 (step 501). The UL small data may be transmitted in RACH (Random Access Channel) based or CG (Configured Grant) based SDT. Optionally, an SRB SDT indication may be provided to indicate that the small data includes the SRB, and the corresponding SRB type may also be indicated. The indication may be in the RRCResumeRequest message, or in the MAC sub-header of the MAC PDU.

Upon receiving the UL Small Data including the SRB, if the receiving gNB 300 is able to resolve the gNB identity contained in the I-RNTI (Inactive Radio Network Temporary Identifier), it requests the last serving gNB 400 to provide UE Context data by sending an XnAP message e.g. the RETRIEVE UE CONTEXT REQUEST message (step 502). Optionally, the SRB SDT indication may be included in the message, so that the last serving gNB 400, upon receiving the message, knows that the small data includes the SRB, and the corresponding SRB type may also be indicated. The SRB SDT indication may be included in assisting information, which is used for the last serving gNB 400 to determine whether anchor relocation is required.

Upon receiving the RETRIEVE UE CONTEXT REQUEST message with or without the SRB SDT indication, the last serving gNB 400 determines that anchor relocation is not required. In this embodiment, the SRB data forwarding information may comprise MAC PDU data forwarding information. The last serving gNB 400 sends an XnAP message, e.g. the RETRIEVE UE CONTEXT FAILURE message and the MAC PDU data forwarding information, which may also be referred to as SRB data forwarding information, to the receiving gNB 300 (step 503C). The MAC PDU data forwarding information includes the IP address and GTP-U TEID of GTP-U tunnel.

The receiving gNB 300 forwards the MAC PDU including the SRB to the last serving gNB 400 via the GTP-U tunnel (step 504C). In some embodiments, the MAC PDU may be sent to the last serving gNB via a common GTP-U tunnel.

According to the DRB and SRB configuration, the last serving gNB 400 processes the MAC PDU, abstracts the NAS PDU from the RRC message (step 506) and forwards the NAS PDU to the AMF (step 506). The last serving gNB 400 may further abstract SDAP SDU (if any) and forward the user data to the UPF 600 (steps 507,508).

MAC PDU Including SRB Transmission Over Control Plane without Anchor Relocation

In some further embodiments, MAC PDU including SRB may also be forwarded via XnAP signalling.

Figure 5D:
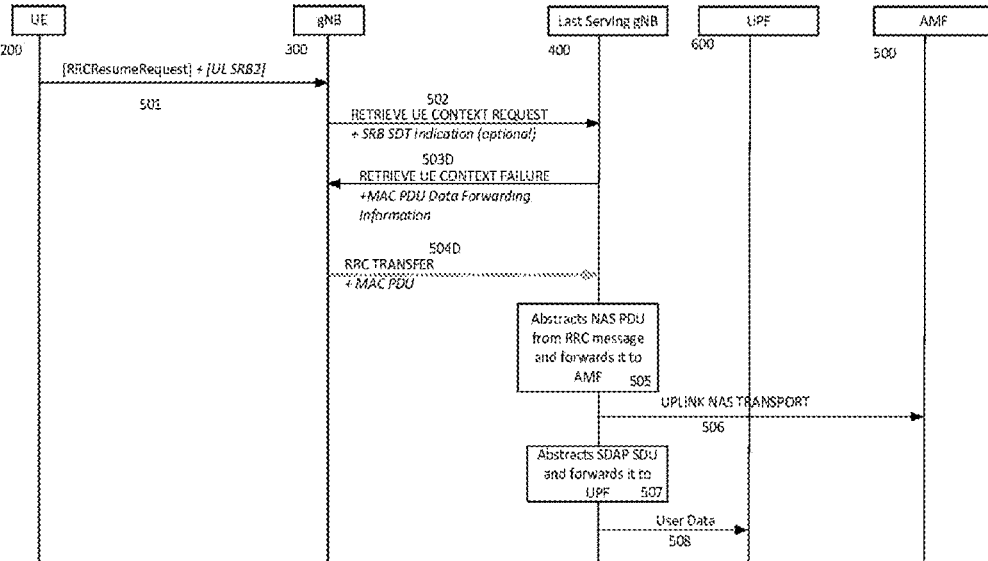
FIG. 5D is a schematic diagram illustrating an example of MAC PDU including SRB transmission over control plane without anchor relocation in accordance with some implementations of the present disclosure.

FIG. 5D is a schematic diagram illustrating an example of MAC PDU including SRB transmission over control plane without anchor relocation in accordance with some implementations of the present disclosure.

The UE 200 sends an RRCResumeRequest message with the UL Small Data including an SRB (e.g., SRB2) to the receiving gNB 300 (step 501). The UL small data may be transmitted in RACH (Random Access Channel) based or CG (Configured Grant) based SDT. Optionally, an SRB SDT indication may be provided to indicate that the small data includes the SRB, and the corresponding SRB type may also be indicated. The indication may be in the RRCResumeRequest message, or in the MAC sub-header of the MAC PDU.

Upon receiving the UL Small Data including the SRB, if the receiving gNB 300 is able to resolve the gNB identity contained in the I-RNTI (Inactive Radio Network Temporary Identifier), it requests the last serving gNB 400 to provide UE Context data by sending an XnAP message e.g. the RETRIEVE UE CONTEXT REQUEST message (step 502). Optionally, the SRB SDT indication may be included in the message, so that the last serving gNB 400, upon receiving the message, knows that the small data includes the SRB, and the corresponding SRB type may also be indicated. The SRB SDT indication may be included in assisting information, which is used for the last serving gNB 400 to determine whether anchor relocation is required.

Upon receiving the RETRIEVE UE CONTEXT REQUEST message with or without the SRB SDT indication, the last serving gNB 400 determines that anchor relocation is not required. The last serving gNB 400 sends an XnAP message, e.g. the RETRIEVE UE CONTEXT FAILURE message Upon receiving the RETRIEVE UE CONTEXT FAILURE message, the receiving gNB 300 forwards the MAC PDU the last serving gNB 400 via XnAP signaling, e.g., an RRC TRANSFER message (step 504D).

According to the DRB and SRB configuration, the last serving gNB 400 processes the MAC PDU, abstracts the NAS PDU from the RRC message (step 506) and forwards the NAS PDU to the AMF (step 506). The last serving gNB 400 may further abstract SDAP SDU (if any) and forward the user data to the UPF 600 (steps 507,508).

Transmission of SRB SDT with Anchor Relocation

In some embodiments, the anchor may be relocated, i.e., the UE context are fetched to the receiving gNB from the last serving gNB.

Figure 5E:
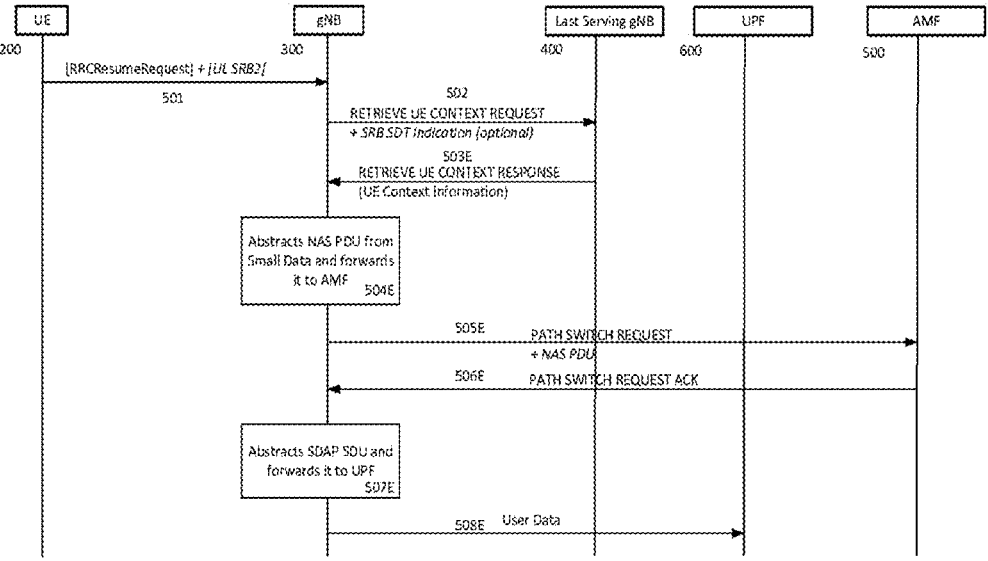
FIG. 5E is a schematic diagram illustrating an example of SRB transmission using SDT with anchor relocation in accordance with some implementations of the present disclosure.

FIG. 5E is a schematic diagram illustrating an example of SRB transmission using SDT with anchor relocation in accordance with some implementations of the present disclosure.

The UE 200 sends an RRCResumeRequest message with the UL Small Data including an SRB (e.g., SRB2) to the receiving gNB 300 (step 501). The UL small data may be transmitted in RACH (Random Access Channel) based or CG (Configured Grant) based SDT. Optionally, an SRB SDT indication may be provided to indicate that the small data includes the SRB, and the corresponding SRB type may also be indicated. The indication may be in the RRCResumeRequest message, or in the MAC sub-header.

Upon receiving the UL Small Data including the SRB, if the receiving gNB 300 is able to resolve the gNB identity contained in the I-RNTI (Inactive Radio Network Temporary Identifier), it requests the last serving gNB 400 to provide UE Context data by sending the an XnAP message RETRIEVE UE CONTEXT REQUEST message (step 502). Optionally, the SRB SDT indication may be included in the message, so that the last serving gNB 400, upon receiving the message, knows that the small data includes the SRB, and the corresponding SRB type may also be indicated. The SRB SDT indication may be included in assisting information, which is used for the last serving gNB 400 to determine whether anchor relocation is required.

After receiving the RETRIEVE UE CONTEXT REQUEST message with or without the SRB SDT indication, the last serving gNB 400 may determine that anchor relocation is required; and it sends an XnAP message, e.g. the RETRIEVE UE CONTEXT RESPONSE message and the UE context for anchor relocation to the receiving gNB 300 (step 503E).

According to the UE context which includes the SRB related configuration, the receiving gNB 300 processes the small data, abstracts the NAS PDU from the small data (step 504E), and forwards the NAS PDU to the AMF 500 with an NGAP message e.g. a PATH SWITCH REQUEST (step 505E). The AMF 500 may return with an NGAP message e.g. the PATH SWITCH REQUEST ACK (step 506E). The NAS PDU may be included in the PATH SWITCH REQUEST message. In some embodiments, the receiving gNB 300 may also abstract SDAP SDU (if any) and forward the user data to the UPF 600 (steps 507E, 508E).

FIG. 6 is a flow chart illustrating steps of SRB transmission using SDT by a receiving gNB 300 in accordance with some implementations of the present disclosure.

At step 602, the receiver 314 of the receiving gNB 300 receives from UE 200 in RRC_INACTIVE or RRC_IDLE state, a small data packet, wherein the small data packet includes an SRB (Signaling Radio Bearer).

At step 604, the transmitter 312 of the receiving gNB 300 sends a retrieve UE context request to a last serving gNB 400 (i.e., a last serving base station) of the UE 200.

At step 606, the receiver 314 of the receiving gNB 300 further receives, from the last serving gNB 400, UE context for anchor relocation, or SRB data forwarding information and/or a SRB configuration, for transmission of the small data packet.

FIG. 7 is a flow chart illustrating steps of SRB transmission using SDT by a last serving gNB 400 in accordance with some implementations of the present disclosure.

At step 702, the receiver 314 of the last serving gNB 400 receives, from a receiving gNB 300 (i.e., a base station), a retrieve UE context request that was initiated by reception of a small data packet with SRB (Signaling Radio Bearer) from UE in RRC_INACTIVE or RRC_IDLE state.

At step 704, the transmitter 312 of the last serving gNB 400 sends, to the receiving gNB 300, UE context in response to a determination that anchor relocation is required.

At step 706, the transmitter 312 of the last serving gNB 400 sends, to the receiving gNB 300, SRB data forwarding information and/or a SRB configuration in response to a determination that anchor relocation is not required.

In one aspect, some items as examples of the disclosure concerning a method of a NE or base station may be summarized as follows:

1. A method performed by a current serving base station, comprising:
   receiving, from a user equipment (UE) in RRC_INACTIVE or RRC_IDLE state, a small data packet, wherein the small data packet includes an SRB (Signaling Radio Bearer);

sending a retrieve UE context request to a last serving base station of the UE; and receiving, from the last serving base station, UE context for anchor relocation, or SRB data forwarding information and/or a SRB configuration, for transmission of the small data packet.

2. The method of item 1, further comprising: sending SRB data to the last serving base station upon receiving, from the last serving base station, the SRB configuration.

3. The method of item 1, further comprising: sending SRB data to the last serving base station upon receiving, from the last serving base station, the SRB data forwarding information.

4. The method of item 3, wherein the SRB data forwarding information comprises an IP address and GTP-U (GPRS Tunnelling Protocol User Plane) TEID (Tunnel Endpoint Identifier) of a dedicated or a common GTP-U tunnel.

5. The method of item 2 or 3, further comprising: abstracting a PDCP (Packet Data Convergence Protocol) PDU (Protocol Data Unit) of the SRB, and sending the PDCP PDU to the last serving base station via a dedicated GTP-U tunnel using the SRB data forwarding information.

6. The method of item 2 or 3, wherein the SRB is included in an MAC (Media Access Control) PDU, and the method further comprises sending the MAC PDU to the last serving base station via a common GTP-U tunnel using the SRB data forwarding information.

7. The method of item 2, further comprising: abstracting a PDCP PDU of the SRB, and sending the PDCP PDU to the last serving base station via XnAP control plane signaling.

8. The method of item 1, wherein the SRB is included in an MAC PDU, and the method further comprises sending the MAC PDU to the last serving base station via XnAP control plane signaling.

9. The method of item 2, wherein the SRB configuration includes RLC (Radio Link Control) configuration of the SRB.

10. The method of item 1, further comprising: receiving, from the UE, an SRB SDT (Small Data Transmission) indication indicating that the SRB is included in the small data packet.

11. The method of item 1, wherein the retrieve UE context request comprises an SRB SDT indication indicating that the SRB is included in the small data packet.

12. The method of item 11, wherein the SRB SDT indication further indicates a type of the SRB included in the small data packet.

13. The method of item 11, wherein the retrieve UE context request further comprises assisting information for the last serving base station to determine whether anchor relocation is required.

14. The method of item 1, further comprising: abstracting an NAS (Non-Access Stratum) PDU from the small data packet and sending the NAS PDU to AMF (Access and Mobility Management Function) upon receiving, from the last serving base station, the UE context for anchor relocation.

15. The method of item 14, further comprising: abstracting an SDAP (Service Data Adaptation Protocol) SDU from the small data packet and sending the SDAP SDU to UPF (User Plane Function).

In another aspect, some items as examples of the disclosure concerning a method of a NE or base station may be summarized as follows:

16. A method performed by a last serving base station, comprising:

receiving, from a base station, a retrieve UE context request that was initiated by reception of a small data packet with SRB (Signaling Radio Bearer) from a user equipment (UE) in RRC_INACTIVE or RRC_IDLE state;

sending, to the base station, UE context in response to a determination that anchor relocation is required; and sending, to the base station, SRB data forwarding information and/or a SRB configuration in response to a determination that anchor relocation is not required.

17. The method of item 16, further comprising: receiving SRB data from the base station after sending the SRB configuration.

18. The method of item 16, further comprising: receiving SRB data from the base station after sending the SRB data forwarding information.

19. The method of item 18, wherein the SRB data forwarding information comprises an IP address and GTP-U (GPRS Tunnelling Protocol User Plane) TEID (Tunnel Endpoint Identifier) of a dedicated or a common GTP-U tunnel.

20. The method of item 17 or 18, further comprising: receiving, from the base station, a PDCP (Packet Data Convergence Protocol) PDU (Protocol Data Unit) of the SRB that was abstracted by the base station, via a dedicated GTP-U (GPRS Tunnelling Protocol User Plane) tunnel using the SRB data forwarding information.

21. The method of item 17 or 18, wherein the SRB is included in an MAC (Media Access Control) PDU, and the method further comprises receiving the MAC PDU from the base station via a common GTP-U tunnel using the SRB data forwarding information.

22. The method of item 17, further comprising: receiving, from the base station, a PDCP PDU of the SRB that was abstracted by the base station, via XnAP control plane signaling.

23. The method of item 16, wherein the SRB is included in an MAC PDU, and the method further comprises receiving the MAC PDU from the base station via XnAP control plane signaling.

24. The method of item 17, wherein the SRB configuration includes RLC (Radio Link Control) configuration of the SRB.

25. The method of item 16, further comprising: receiving, from the base station, an SRB SDT (Small Data Transmission) indication indicating that the SRB is included in the small data packet.

26. The method of item 16, wherein the retrieve UE context request comprises an SRB SDT indication indicating that the SRB is included in the small data packet.

27. The method of item 26, wherein the SRB SDT indication further indicates a type of the SRB included in the small data packet.

28. The method of item 26, wherein the retrieve UE context request further comprises assisting information for determining whether anchor relocation is required.

29. The method of item 17, further comprising: abstracting an NAS (Non-Access Stratum) PDU and sending the NAS PDU to AMF (Access and Mobility Management Function).

30. The method of item 29, further comprising: sending user data to UPF (User Plane Function).

In a further aspect, some items as examples of the disclosure concerning a UE or remote device may be summarized as follows:

31. An apparatus, comprising:

a receiver that receives, from a user equipment (UE) in RRC_INACTIVE or RRC_IDLE state, a small data packet, wherein the small data packet includes an SRB (Signaling Radio Bearer);

a transmitter that sends a retrieve UE context request to a last serving base station of the UE; and wherein the receiver further receives, from the last serving base station, UE context for anchor relocation, or SRB data forwarding information and/or a SRB configuration, for transmission of the small data packet.

32. The apparatus of item 31, wherein the transmitter further sends SRB data to the last serving base station upon receiving, from the last serving base station, the SRB configuration.

33. The apparatus of item 31, wherein the transmitter further sends SRB data to the last serving base station upon receiving, from the last serving base station, the SRB data forwarding information.

34. The apparatus of item 33, wherein the SRB data forwarding information comprises an IP address and GTP-U (GPRS Tunnelling Protocol User Plane) TEID (Tunnel Endpoint Identifier) of a dedicated or a common GTP-U tunnel.

35. The apparatus of item 32 or 33, further comprising: a processor that abstracts a PDCP (Packet Data Convergence Protocol) PDU (Protocol Data Unit) of the SRB, and wherein the transmitter further sends the PDCP PDU to the last serving base station via a dedicated GTP-U tunnel using the SRB data forwarding information.

36. The apparatus of item 32 or 33, wherein the SRB is included in an MAC (Media Access Control) PDU, and the transmitter further sends the MAC PDU to the last serving base station via a common GTP-U tunnel using the SRB data forwarding information.

37. The apparatus of item 32, further comprising: a processor that abstracts a PDCP PDU of the SRB, and wherein the transmitter further sends the PDCP PDU to the last serving base station via XnAP control plane signaling.

38. The apparatus of item 31, wherein the SRB is included in an MAC PDU, and the transmitter further sends the MAC PDU to the last serving base station via XnAP control plane signaling.

39. The apparatus of item 32, wherein the SRB configuration includes RLC (Radio Link Control) configuration of the SRB.

40. The apparatus of item 31, wherein the receiver further receives, from the UE, an SRB SDT (Small Data Transmission) indication indicating that the SRB is included in the small data packet.

41. The apparatus of item 31, wherein the retrieve UE context request comprises an SRB SDT indication indicating that the SRB is included in the small data packet.

42. The apparatus of item 41, wherein the SRB SDT indication further indicates a type of the SRB included in the small data packet.

43. The apparatus of item 41, wherein the retrieve UE context request further comprises assisting information for the last serving base station to determine whether anchor relocation is required.

44. The apparatus of item 31, further comprising: a processor that abstracts an NAS (Non-Access Stratum) PDU from the small data packet and the transmitter further sends the NAS PDU to AMF (Access and Mobility Management Function) upon receiving, from the last serving base station, the UE context for anchor relocation.

45. The apparatus of item 44, further comprising: a processor that abstracts an SDAP (Service Data Adaptation Protocol) SDU from the small data packet and the transmitter further sends the SDAP SDU to UPF (User Plane Function).

In a yet further aspect, some items as examples of the disclosure concerning a NE or base station may be summarized as follows:

46. An apparatus, comprising:

a receiver that receives, from a base station, a retrieve UE context request that was initiated by reception of a small data packet with SRB (Signaling Radio Bearer) from a user equipment (UE) in RRC_INACTIVE or RRC_IDLE state;

a transmitter that sends, to the base station, UE context in response to a determination that anchor relocation is required; and wherein the transmitter further sends, to the base station, SRB data forwarding information and/or a SRB configuration in response to a determination that anchor relocation is not required.

47. The apparatus of item 46, wherein the receiver further receives SRB data from the base station after sending the SRB configuration.

48. The apparatus of item 46, wherein the receiver further receives SRB data from the base station after sending the SRB data forwarding information.

49. The apparatus of item 48, wherein the SRB data forwarding information comprises an IP address and GTP-U (GPRS Tunnelling Protocol User Plane) TEID (Tunnel Endpoint Identifier) of a dedicated or a common GTP-U tunnel.

50. The apparatus of item 47 or 48, wherein the receiver further receives, from the base station, a PDCP (Packet Data Convergence Protocol) PDU (Protocol Data Unit) of the SRB that was abstracted by the base station, via a dedicated GTP-U (GPRS Tunnelling Protocol User Plane) tunnel using the SRB data forwarding information.

51. The apparatus of item 47 or 48, wherein the SRB is included in an MAC (Media Access Control) PDU, and the receiver further receives the MAC PDU from the base station via a common GTP-U tunnel using the SRB data forwarding information.

52. The apparatus of item 47, wherein the receiver further receives, from the base station, a PDCP PDU of the SRB that was abstracted by the base station, via XnAP control plane signaling.

53. The apparatus of item 46, wherein the SRB is included in an MAC PDU, and the receiver further receives the MAC PDU from the base station via XnAP control plane signaling.

54. The apparatus of item 47, wherein the SRB configuration includes RLC (Radio Link Control) configuration of the SRB.

55. The apparatus of item 46, wherein the receiver further receives, from the base station, an SRB SDT (Small Data Transmission) indication indicating that the SRB is included in the small data packet.

56. The apparatus of item 46, wherein the retrieve UE context request comprises an SRB SDT indication indicating that the SRB is included in the small data packet.

57. The apparatus of item 56, wherein the SRB SDT indication further indicates a type of the SRB included in the small data packet.

58. The apparatus of item 56, wherein the retrieve UE context request further comprises assisting information for determining whether anchor relocation is required.

59. The apparatus of item 46, further comprising: a processor that abstracts an NAS (Non-Access Stratum) PDU and the transmitter further sends the NAS PDU to AMF (Access and Mobility Management Function).

60. The apparatus of item 59, wherein the transmitter further sends user data to UPF (User Plane Function).

In some further aspects, the disclosure relates to: a current serving base station, including: a processor; a transceiver coupled to the processor, wherein the processor is configured: to receive, from a user equipment (UE) in RRC_INACTIVE or RRC_IDLE state, a small data packet, wherein the small data packet includes an SRB (Signaling Radio Bearer); to send a retrieve UE context request to a last serving base station of the UE; and to receive, from the last serving base station, UE context for anchor relocation, or SRB data forwarding information and/or a SRB configuration, for transmission of the small data packet.

In some further aspects, the disclosure relates to: a last serving base station, including: a processor; a transceiver coupled to the processor, wherein the processor is configured: to receive, from a base station, a retrieve UE context request that was initiated by reception of a small data packet with SRB (Signaling Radio Bearer) from a user equipment (UE) in RRC_INACTIVE or RRC_IDLE state; to send, to the base station, UE context in response to a determination that anchor relocation is required; and to further send, to the base station, SRB data forwarding information and/or a SRB configuration in response to a determination that anchor relocation is not required.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A method performed by a current serving base station, comprising:

receiving, from a user equipment (UE) in a radio resource control (RRC) inactive state or a RRC idle state, a small data packet that includes a signaling radio bearer (SRB);

sending a retrieve UE context request to a last serving base station of the UE, the retrieve UE context request comprising assisting information for the last serving base station to determine whether anchor relocation is required; and receiving, from the last serving base station, a UE context for the anchor relocation, or at least one of SRB data forwarding information or a SRB configuration, for transmission of the small data packet.

2. The method of claim 1, further comprising: sending SRB data to the last serving base station based on receiving, from the last serving base station, the SRB configuration.

3. The method of claim 1, further comprising: sending SRB data to the last serving base station based on receiving, from the last serving base station, the SRB data forwarding information.

4. The method of claim 3, wherein the SRB data forwarding information comprises an Internet protocol (IP) address and a general packet radio service (GPRS) tunnelling protocol user plane (GTP-U) tunnel endpoint identifier (TEID) of a dedicated GTP-U tunnel or a common GTP-U tunnel.

5. The method of claim 2, further comprising: abstracting a packet data convergence protocol (PDCP) protocol data unit (PDU) of the SRB, and sending the PDCP PDU to the last serving base station via Xn application protocol (XnAP) control plane signaling.

6. The method of claim 1, wherein the SRB is included in a media access control (MAC) protocol data unit (PDU), and the method further comprises sending the MAC PDU to the last serving base station via Xn application protocol (XnAP) control plane signaling.

7. The method of claim 2, wherein the SRB configuration includes a radio link control (RLC) configuration of the SRB.

8. The method of claim 1, further comprising: receiving, from the UE, an SRB small data transmission (SDT) indication indicating that the SRB is included in the small data packet.

9. The method of claim 1, wherein the retrieve UE context request comprises an SRB small data transmission (SDT) indication indicating that the SRB is included in the small data packet and a type of the SRB included in the small data packet.

10. A current serving base station, comprising:

at least one memory;

at least one processor coupled with the at least one memory and configured to cause the current serving base station to:

receive, from a user equipment (UE) in a radio resource control (RRC) inactive state or a RRC idle state, a small data packet that includes a signaling radio bearer (SRB);

send a retrieve UE context request to a last serving base station of the UE, the retrieve UE context request comprising assisting information for the last serving base station to determine whether anchor relocation is required; and receive, from the last serving base station, a UE context for the anchor relocation, or at least one of SRB data forwarding information or a SRB configuration, for transmission of the small data packet.

11. The current serving base station of claim 10, wherein the at least one processor is configured to cause the current serving base station to send SRB data to the last serving base station based on receiving, from the last serving base station, the SRB configuration.

12. The current serving base station of claim 11, wherein the at least one processor is configured to cause the current serving base station to abstract a packet data convergence protocol (PDCP) protocol data unit (PDU) of the SRB, and sending the PDCP PDU to the last serving base station via Xn application protocol (XnAP) control plane signaling.

13. The current serving base station of claim 11, wherein the SRB configuration includes a radio link control (RLC) configuration of the SRB.

14. The current serving base station of claim 10, wherein the at least one processor is configured to cause the current serving base station to send SRB data to the last serving base station based on receiving, from the last serving base station, the SRB data forwarding information.

15. The current serving base station of claim 14, wherein the SRB data forwarding information comprises an Internet protocol (IP) address and a general packet radio service (GPRS) tunnelling protocol user plane (GTP-U) tunnel endpoint identifier (TEID) of a dedicated GTP-U tunnel or a common GTP-U tunnel.

16. The current serving base station of claim 10, wherein the SRB is included in a media access control (MAC) protocol data unit (PDU), and wherein the at least one processor is configured to cause the current serving base station to send the MAC PDU to the last serving base station via Xn application protocol (XnAP) control plane signaling.

17. The current serving base station of claim 10, wherein the at least one processor is configured to cause the current serving base station to receive, from the UE, an SRB small data transmission (SDT) indication indicating that the SRB is included in the small data packet.

18. The current serving base station of claim 10, wherein the retrieve UE context request comprises an SRB small data transmission (SDT) indication indicating that the SRB is included in the small data packet and a type of the SRB included in the small data packet.

19. A last serving base station, comprising:

at least one memory; and at least one processor coupled with the at least one memory and configured to cause the last serving base station to:

receive, from a current serving base station, a retrieve user equipment (UE) context request based at least in part on reception of a small data packet with signaling radio bearer (SRB) from a UE in a radio resource control (RRC) inactive state or a RRC idle state, the retrieve UE context request comprising assisting information for the last serving base station to determine whether anchor relocation is required;

send, to the current serving base station, a UE context in response to a determination that the anchor relocation is required; and send, to the current serving base station, at least one of SRB data forwarding information or a SRB configuration in response to the determination that the anchor relocation is not required.

20. The last serving base station of claim 19, wherein the SRB configuration includes a radio link control (RLC) configuration of the SRB.

* * * * *